(12) United States Patent
Kanayama

(10) Patent No.: US 11,280,264 B2
(45) Date of Patent: Mar. 22, 2022

(54) ACOUSTIC INSULATION SYSTEM FOR INTERNAL COMBUSTION ENGINE

(71) Applicant: TOYOTA JIDOSHA KABUSHIKI KAISHA, Toyota (JP)

(72) Inventor: Wataru Kanayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 471 days.

(21) Appl. No.: 16/288,935

(22) Filed: Feb. 28, 2019

(65) Prior Publication Data

US 2019/0323425 A1    Oct. 24, 2019

(30) Foreign Application Priority Data

Apr. 23, 2018  (JP) .............................. JP2018-082550

(51) Int. Cl.
*F02B 77/13*   (2006.01)
*G10K 11/162*   (2006.01)

(52) U.S. Cl.
CPC ............ *F02B 77/13* (2013.01); *G10K 11/162* (2013.01)

(58) Field of Classification Search
CPC .............................. F02B 77/13; G10K 11/162
USPC ....................................................... 181/204
See application file for complete search history.

(56) References Cited

U.S. PATENT DOCUMENTS

| 6,142,108 | A | * | 11/2000 | Blichmann | ............. | F01P 7/026 |
| | | | | | | 123/41.05 |
| 10,411,556 | B1 | * | 9/2019 | Sakaray | ............... | H02K 7/1823 |
| 10,688,844 | B2 | * | 6/2020 | Tanaka | ................... | B60K 11/06 |
| 10,775,074 | B2 | * | 9/2020 | Rainey | .................. | F24F 3/0442 |
| 11,052,580 | B2 | * | 7/2021 | Lemaire | ............... | G10K 11/168 |
| 2003/0029581 | A1 | * | 2/2003 | Vide | ........................ | B60L 8/006 |
| | | | | | | 160/201 |
| 2014/0251239 | A1 | | 9/2014 | Richards et al. | | |
| 2016/0096424 | A1 | * | 4/2016 | Schiller | ................ | B62D 25/084 |
| | | | | | | 180/68.1 |
| 2021/0254585 | A1 | * | 8/2021 | Kodama | ................ | B60K 13/02 |

FOREIGN PATENT DOCUMENTS

| DE | 102006009600 A1 | 9/2007 |
| DE | 10 2014 220119 A1 | 4/2016 |
| JP | H08-225021 A | 9/1996 |
| JP | 2017-013638 A | 1/2017 |

* cited by examiner

*Primary Examiner* — Forrest M Phillips
(74) *Attorney, Agent, or Firm* — Oliff PLC

(57) ABSTRACT

An acoustic insulation system for an internal combustion engine mounted on a vehicle includes: an acoustic insulation cover configured to cover the internal combustion engine with a gap interposed between the acoustic insulation cover and the internal combustion engine. The acoustic insulation cover includes a cover front portion that faces forward of the vehicle. The cover front portion includes: a plurality of inlets for introducing the outside air into the interior of the acoustic insulation cover; and a plurality of inlet flaps configured to respectively open and close the plurality of inlets. The acoustic insulation system further includes a control device configured to control the opening and closing of the plurality of inlet flaps.

4 Claims, 7 Drawing Sheets

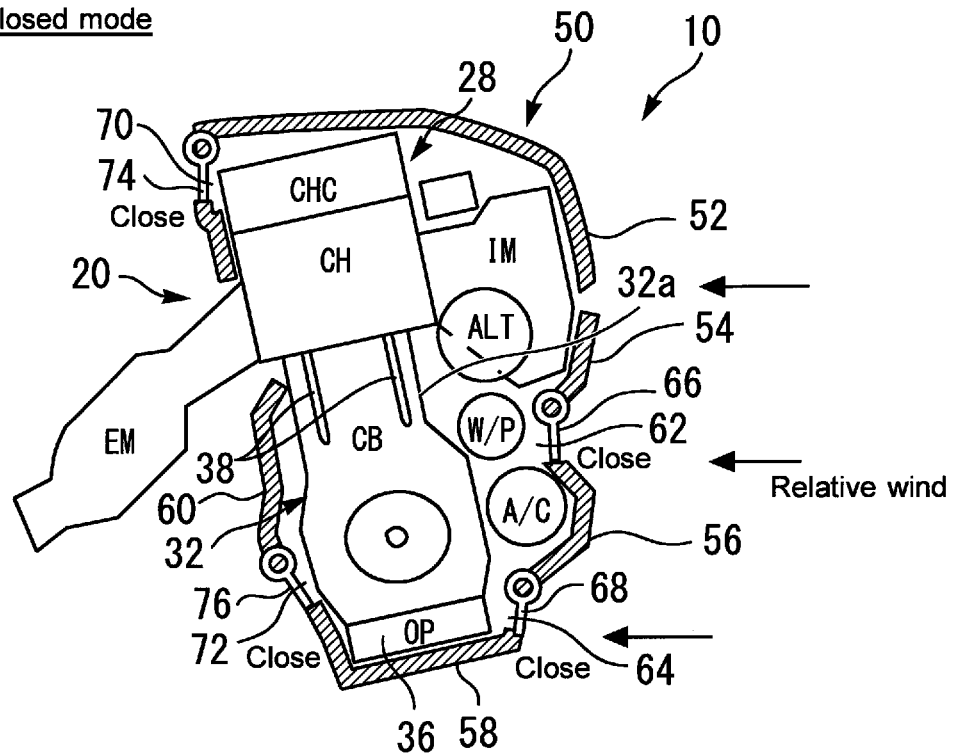
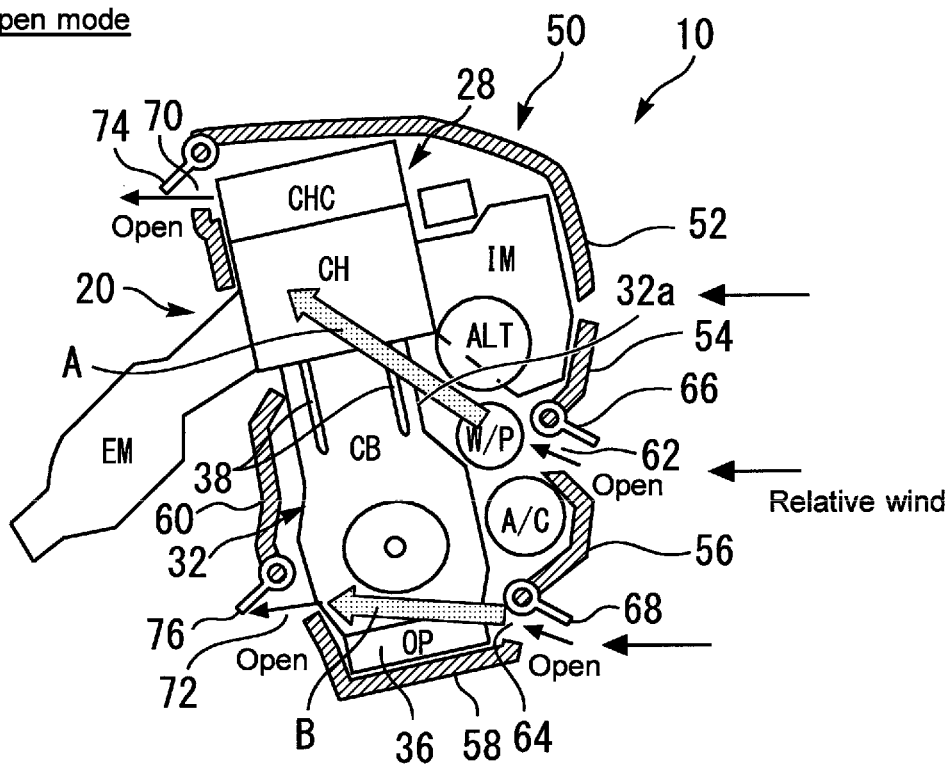

Interior of acoustic insulation cover

Fully closed

Fully open

Equivalent to
first partially open mode

Equivalent to
second partially open mode

ACOUSTIC INSULATION SYSTEM FOR INTERNAL COMBUSTION ENGINE

CROSS-REFERENCE TO RELATED APPLICATION

This application is based on and claims the benefit of Japanese Patent Application No. 2018-082550, filed on Apr. 23, 2018, which is incorporated by reference herein in its entirety.

BACKGROUND

Technical Field

The present disclosure relates to an acoustic insulation system for an internal combustion engine.

Background Art

For example, JP 2017-013638 A discloses a cooling control structure for an engine compartment. This cooling control structure is provided with a heat retention cover that covers the periphery of an internal combustion engine arranged in the engine compartment.

More specifically, one inlet and one outlet of cooling wind are formed in the heat retention cover. In addition, an inlet opening/closing portion for adjusting the intake amount of the cooling wind is provided at a formation portion of the inlet, and an outlet opening/closing portion for adjusting the discharge amount of the cooling wind is provided at a formation portion of the outlet.

SUMMARY

According to the cooling control structure for the engine compartment disclosed in JP 2017-013638 A, although the flow rate of the cooling wind (outside air) taken into the interior of the heat retention cover from the inlet is adjustable, the path of the flow of the outside air in the interior of the heat retention cover is uniform. Because of this, it is difficult to properly control the path of the flow of the outside air in the interior of the heat retention cover in accordance with needs based on the individual operating conditions of the internal combustion engine or the respective needs for a plurality of engine parts. In this respect, the structure disclosed in JP 2017-013638 A still has room for improvement in terms of properly controlling the path of the flow of the outside air taken into the interior of the heat retention cover.

The present disclosure has been made to address the problem described above, and an object of the present disclosure is to provide an acoustic insulation system for an internal combustion engine that can more properly control the path of the flow of the outside air taken into the interior of an acoustic insulation cover that covers the internal combustion engine.

An acoustic insulation system for an internal combustion engine according to the present disclosure is applied to an internal combustion engine mounted on a vehicle. The acoustic insulation system includes: an acoustic insulation cover configured to cover the internal combustion engine with a gap interposed between the acoustic insulation cover and the internal combustion engine; and a control device. The acoustic insulation cover includes a cover front portion that faces forward of the vehicle. The cover front portion includes: a plurality of inlets for introducing outside air into an interior of the acoustic insulation cover; and a plurality of inlet flaps configured to respectively open and close the plurality of inlets. The control device is configured to control opening and closing of the plurality of inlet flaps.

The acoustic insulation cover may include a cover rear portion that faces rearward of the vehicle. The cover rear portion may also include: a plurality of outlets for discharging the outside air introduced into the interior of the acoustic insulation cover; and a plurality of outlet flaps configured to respectively open and close the plurality of outlets.

The control device may be configured to: open and close the plurality of outlet flaps in addition to the plurality of inlet flaps; and control the plurality of outlet flaps such that the plurality of outlets closes during acceleration of the vehicle.

The control device may be configured to control the plurality of inlet flaps such that the plurality of inlets closes during acceleration of the vehicle.

The internal combustion engine may include a cylinder block provided with a water jacket portion that covers a water jacket through which engine cooling water flows. One of the plurality of inlets may also be a first inlet configured to introduce the outside air toward the water jacket portion.

The internal combustion engine may include an oil pan that stores engine lubricating oil. One of the plurality of inlets may also be a second inlet configured to introduce the outside air toward the oil pan.

The internal combustion engine may include: a cylinder block provided with a water jacket portion that covers a water jacket through which engine cooling water flows; and an oil pan that stores engine lubricating oil. One of the plurality of inlets may also be a first inlet configured to introduce the outside air toward the water jacket portion. Another one of the plurality of inlets may also be a second inlet configured to introduce the outside air toward the oil pan. The control device may also be configured, where temperature of the engine cooling water is higher than or equal to a first warm-up determination temperature and temperature of the engine lubricating oil is lower than a second warm-up determination temperature, to control one of the plurality of inlet flaps such that the first inlet opens and control another one of the plurality of inlet flaps such that the second inlet closes.

The acoustic insulation cover may include a cover rear portion that faces rearward of the vehicle. The cover rear portion may also include: a plurality of outlets for discharging the outside air introduced into the interior of the acoustic insulation cover; and a plurality of outlet flaps configured to respectively open and close the plurality of outlets. The control device may also be configured to open and close the plurality of outlet flaps in addition to the plurality of inlet flaps. One of the plurality of outlets may also be a first outlet configured to discharge the outside air introduced toward the water jacket portion. Another one of the plurality of outlets may also be a second outlet configured to discharge the outside air introduced toward the oil pan. The control device may also be configured, where the temperature of the engine cooling water is higher than or equal to the first warm-up determination temperature and the temperature of the engine lubricating oil is lower than the second warm-up determination temperature, to control one of the plurality of outlet flaps such that the first outlet opens and control another one of the plurality of outlet flaps such that the second outlet closes.

The internal combustion engine may include: a cylinder block provided with a water jacket portion that covers a water jacket through which engine cooling water flows; and an oil pan that stores engine lubricating oil. One of the plurality of inlets may also be a first inlet configured to introduce the outside air toward the water jacket portion. Another one of the plurality of inlets may also be a second inlet configured to introduce the outside air toward the oil pan. The control device may also be configured, where: outside air temperature is lower than or equal to a temperature threshold value; engine speed is higher than or equal to a speed threshold value; and engine load is higher than or equal to a load threshold value, to control one of the plurality of inlet flaps such that the first inlet closes and control another one of the plurality of inlet flaps such that the second inlet opens.

The acoustic insulation cover may include a cover rear portion that faces rearward of the vehicle. The cover rear portion may include: a plurality of outlets for discharging the outside air introduced into the interior of the acoustic insulation cover; and a plurality of outlet flaps configured to respectively open and close the plurality of outlets. The control device may also be configured to open and close the plurality of outlet flaps in addition to the plurality of inlet flaps. One of the plurality of outlets may also be a first outlet configured to discharge the outside air introduced toward the water jacket portion. Another one of the plurality of outlets may also be a second outlet configured to discharge the outside air introduced toward the oil pan. The control device may also be configured, where: the outside air temperature is lower than or equal to the temperature threshold value; the engine speed is higher than or equal to the speed threshold value; and the engine load is higher than or equal to the load threshold value, to control one of the plurality of outlet flaps such that the first outlet closes and control another one of the plurality of outlet flaps such that the second outlet opens.

The plurality of outlet flaps may be wind-operated flaps.

According to the acoustic insulation system for an internal combustion engine of the present disclosure, the acoustic insulation cover configured to cover the internal combustion engine with the gap interposed therebetween includes a cover front portion that faces forward of the vehicle. The cover front portion includes: the plurality of inlets for introducing the outside air into the interior of the acoustic insulation cover; and the plurality of inlet flaps configured to respectively open and close the plurality of inlets. On that basis, the opening and closing of the plurality of inlet flaps are controlled by the control device. As a result, a higher degree of freedom of selection of the path of the flow of the outside air taken into the interior of the acoustic insulation cover can be given as compared to an example in which only one set of an inlet and an inlet flap is arranged. Therefore, according to the present disclosure, the path of the flow of the outside air taken into the interior of the acoustic insulation cover can be more properly controlled.

BRIEF DESCRIPTION OF THE DRAWINGS

FIG. 2 is a schematic diagram that illustrates a fully closed mode in which all of two inlet flaps and two outlet flaps are closed;

FIG. 3 is a schematic diagram that illustrates a fully open mode in which all of two inlet flaps and two outlet flaps are open;

DETAILED DESCRIPTION

Figure 1:
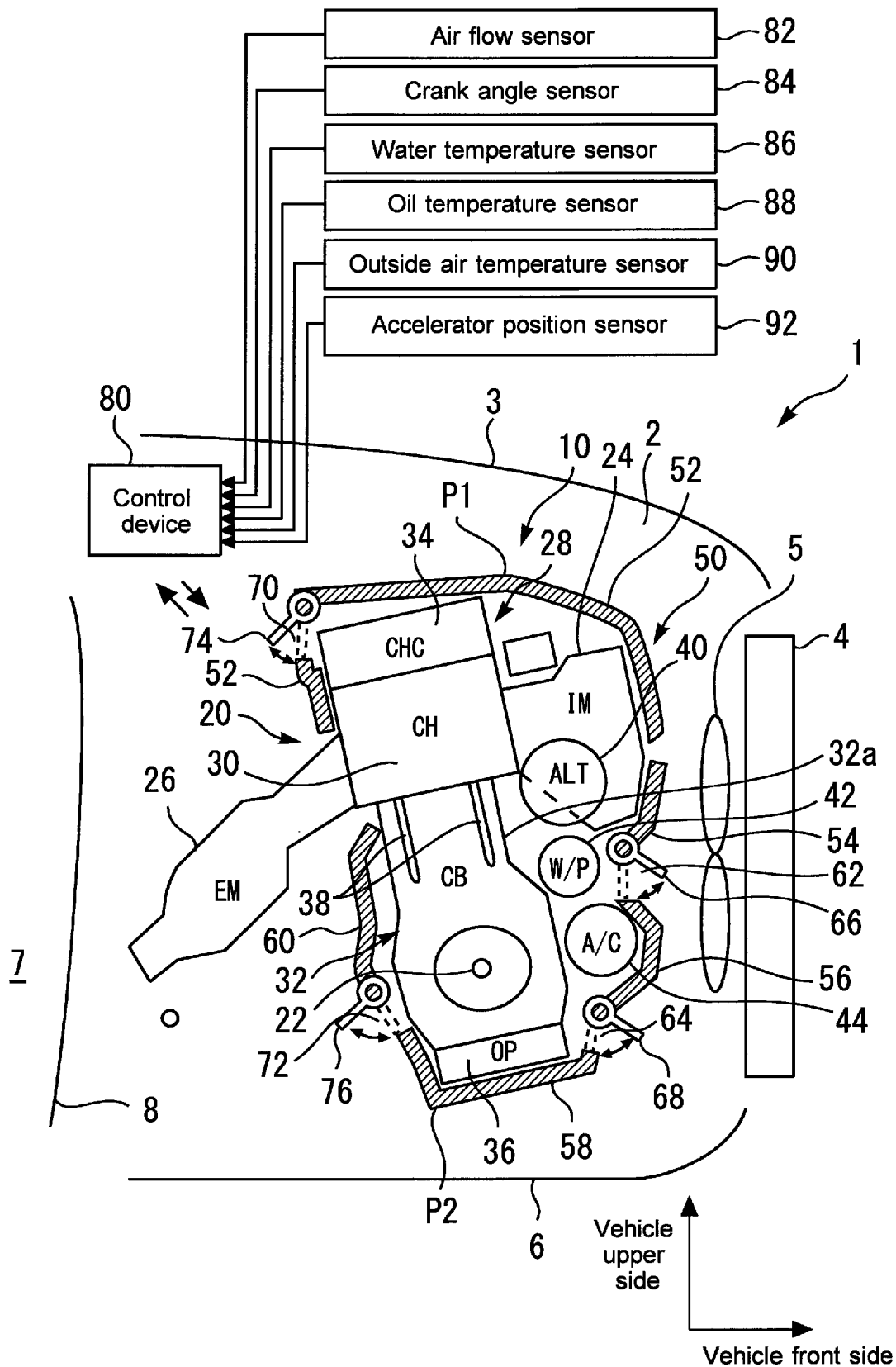
FIG. 1 is a diagram (vehicle side view) that schematically illustrates the configuration of an internal combustion engine to which an acoustic insulation system according to a first embodiment of the present disclosure is applied and around the internal combustion engine.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 5.

1-1. Configuration of Acoustic Insulation System 1-1-1. Configuration of Internal Combustion Engine and Therearound FIG. 1 is a diagram (vehicle side view) that schematically illustrates the configuration of an internal combustion engine 20 to which an acoustic insulation system 10 according to the first embodiment of the present disclosure is applied and around the internal combustion engine 20. As shown in FIG. 1, the internal combustion engine 20 is mounted on a vehicle

1. In more detail, the internal combustion engine 20 is installed in an engine compartment 2 of the vehicle 1.

In FIG. 1, the right side of the sheet corresponds to the front side of the vehicle 1, and the upper side of the sheet corresponds to the upper side of the vehicle 1. An engine hood 3 is arranged at the vehicle upper side of the internal combustion engine 20. A radiator 4 and a cooling fan 5 are arranged at the vehicle front side of the internal combustion engine 20. Engine cooling water for cooling the internal combustion engine 20 flows through the interior of the radiator 4. In addition, an engine lower cover 6 is arranged at the vehicle lower side of the internal combustion engine 20, and a bulkhead 8 (such as, cowl top panel and dash panel) that separates the engine compartment 2 from a vehicle interior 7 is arranged at the vehicle rear side. It should be noted that vehicle components (not shown), such as a suspension tower, are arranged at both the vehicle-left-and-right sides of the internal combustion engine 20.

In the example shown in FIG. 1, the internal combustion engine 20 is mounted on the vehicle 1 such that the axial direction of a crankshaft 22 coincides with the left-right direction of the vehicle 1. Also, in the example shown in FIG. 1, the internal combustion engine 20 is mounted on the vehicle 1 such that intake system parts including an intake manifold (IM) 24 are located on the vehicle front side and exhaust system parts including an exhaust manifold (EM) 26 are located on the vehicle rear side.

Moreover, the internal combustion engine 20 is equipped with an engine main body 28. The engine main body 28 includes a cylinder head (CH) 30, a cylinder block (CB) 32 including a crankcase, a cylinder head cover (CHC) 34 and an oil pan (OP) 36 in addition to the crankshaft 22 described above. A water jacket 38 through which the engine cooling water described above flows is formed around each cylinder of the cylinder block 32. The cylinder block 32 includes a water jacket portion 32a that covers the water jacket 38. The cylinder head cover 34 is attached to the cylinder head 30 so as to cover an upper portion of the cylinder head 30. The oil pan 36 is arranged below the cylinder block 32. An oil (engine lubricating oil) that lubricates individual portions of the internal combustion engine 20 is stored in the interior of the oil pan 36.

Furthermore, the internal combustion engine 20 is equipped with an alternator (ALT) 40, a water pump (W/P) 42, a compressor (hereunder, an "A/C compressor") 44 of an air conditioner for the vehicle interior 7, and an oil pump (not shown). The alternator 40 performs electric power generation by the use of a torque of the crankshaft 22. The water pump 42, the A/C compressor 44 and the above-described oil pump respectively supply the engine cooling water, refrigerant for the air conditioner, and the engine lubricating oil, by the use of the torque of the crankshaft 22.

1-1-2. Configuration of Acoustic Insulation Cover (Acoustic Insulation Structure)

As shown in FIG. 1, the acoustic insulation system 10 according to the present embodiment is provided with an acoustic insulation cover 50. The acoustic insulation cover 50 covers the internal combustion engine 20 with a gap interposed between the acoustic insulation cover 50 and the internal combustion engine 20. This gap corresponds to a space where introduction of the outside air described later is available to dissipate heat from the individual portions of the internal combustion engine 20. The acoustic insulation cover 50 is configured by a material having a high acoustic absorption performance. Moreover, as the material of the acoustic insulation cover 50, a material having a certain level of stiffness is used. An example of the material of the acoustic insulation cover 50 that satisfies this kind of requests is a fibrous material made of PET (Polyethylene terephthalate) fiber. It should be noted that, although the manner of attachment of the acoustic insulation cover 50 to the internal combustion engine 20 is not particularly limited, the acoustic insulation cover 50 is attached to the internal combustion engine 20 using, as an example, a fastener (such as bolts) which is not shown.

1-1-2-1. Cover Pieces

According to the example shown in FIG. 1, the acoustic insulation cover 50 is configured by five cover pieces 52, 54, 56, 58 and 60 divided from each other. To be more specific, the cover piece 52 is formed so as to mainly cover an upper portion of the internal combustion engine 20 (in detail, an upper portion of the cylinder head cover 34 and an upper portion of the intake manifold 24). In addition, the cover piece 52 is formed so as to also cover a portion of the internal combustion engine 20 located on the upper side in the top-bottom direction of the vehicle 1 in the vehicle front view (in detail, a portion of the cylinder head cover 34 located on the vehicle front side, and a portion of the intake manifold 24 located on the upper side in the top-bottom direction of the vehicle 1 in the vehicle front view). Furthermore, the cover piece 52 is formed so as to further cover a portion of the engine main body 28 located on the upper side in the top-bottom direction of the vehicle 1 in the vehicle rear view (in detail, a portion of the cylinder head cover 34 located on the vehicle rear side).

The cover piece 54 is arranged below the cover piece 52, and is formed so as to cover a portion of the internal combustion engine 20 located on the middle side in the top-bottom direction of the vehicle 1 in the vehicle front view (in detail, a portion of the intake manifold 24 located on the lower side in the top-bottom direction of the vehicle 1 in the vehicle front view, a part of the cylinder block 32 (mainly, water jacket portion 32a), the alternator 40 and the water pump 42). The cover piece 56 is arranged below the cover piece 54, and is formed so as to cover a portion of the internal combustion engine 20 located on the lower side in the top-bottom direction of the vehicle 1 in the vehicle front view (in detail, a part of the cylinder block 32, the A/C compressor 44, and a portion of the oil pan 36 located on the vehicle front side).

The cover piece 58 is arranged below the cover piece 56, and is formed so as to cover a bottom portion of the engine main body 28 (in detail, the bottom surface of the oil pan 36, a portion of the oil pan 36 located on the vehicle rear side, and a part of the cylinder block 32). The cover piece 60 is arranged above the cover piece 58 and below the exhaust manifold 26, and is formed so as to cover a portion of the engine main body 28 located on the middle side in the top-bottom direction of the vehicle 1 in the vehicle rear view (in detail, a part of the cylinder block 32 including the water jacket portion 32a).

(Cover Front Portion and Cover Rear Portion)

According to the example of five cover pieces 52 to 60 described above, a portion of the cover piece 52 located on the vehicle front side relative to the highest point P1, the whole cover pieces 54 and 56, and a portion of the cover piece 58 located on the vehicle front side relative to the lowest point P2 each face forward of the vehicle 1. Thus, each of them corresponds to an example of the "cover front portion" according to the present disclosure. In addition, a portion of the cover piece 52 located on the vehicle rear side relative to the highest point P1, a portion of the cover piece 58 located on the vehicle rear side relative to the lowest point P2, and the whole cover piece 60 each face rearward of the vehicle 1. Thus, each of them corresponds to an example of the "cover rear portion" according to the present disclosure.

It should be noted that, with respect to the left-right direction of the vehicle 1, each of the cover pieces 52 to 60 is formed so as to extend over the whole width of the internal combustion engine 20 (engine main body 28) in this direction, as an example. In addition, side end surfaces of the engine main body 28 located on the vehicle left side and vehicle right side are each covered by other one or more cover pieces (not shown). As a result, when flaps 66, 68, 74 and 76 described below are opened, the flow of the outside air moving toward the "cover rear portion" from the "cover front portion" is formed in the interior of the acoustic insulation cover 50. It should be noted that, in order to form this kind of flow of the outside air, only either one of the side end surfaces of the engine main body 28 located on the vehicle left side and vehicle right side may alternatively be covered by other one or more cover pieces.

Furthermore, the cover pieces 52 to 60 described above may be extended, and at least one of the side end surfaces of the engine main body 28 located on the vehicle left side and vehicle right side may alternatively be covered by a part or all of these cover pieces 52 to 60. In addition, a transmission or a vehicle driving motor is attached to one of the side end surfaces of the engine main body 28 located on the vehicle left side and vehicle right side. Therefore, one of the side end surfaces may be covered as a result of the transmission or the vehicle driving motor being covered by a desired cover piece.

1-1-2-2. Inlets and Inlet Flaps of Outside Air

The above-described "cover front portion" of the acoustic insulation cover 50 is provided with a plurality of (in the example shown in FIG. 1, two) inlets 62 and 64 configured to introduce the outside air into the interior of the acoustic insulation cover 50, and a plurality of (in the example shown in FIG. 1, two) inlet flaps 66 and 68 configured to respectively open and close these inlets 62 and 64.

To be more specific, the first inlet 62 corresponds to an opening portion located on the lower portion of the cover piece 54, and is formed to introduce the outside air (i.e., relative wind or wind from the cooling fan 5) toward the water jacket portion 32a. The second inlet 64 corresponds to an opening portion located on the lower portion of the cover piece 56, and is formed to introduce the outside air toward the oil pan 36. The widths of these inlets 62 and 64 in the left-right direction of the vehicle 1 are not particularly limited, and are voluntarily determined, for example, such that superior ventilation performance can be achieved in the interior of the acoustic insulation cover 50. For example, these widths may be determined so as to be equal to a part or all of the widths of the cover pieces 54 and 56 in the left-right direction of the vehicle 1. It should be noted that, instead of this kind of examples, a plurality of inlets and a plurality of inlet flaps may be arranged at one cover piece.

The first inlet flap 66 is configured to open and close the first inlet 62, and the second inlet flap 68 is configured to open and close the second inlet 64. These inlet flaps 66 and 68 are electrically driven, as an example. It should be noted that, according to the example shown in FIG. 1, the individual rotational shafts of the inlet flaps 66 and 68 for the opening and closing thereof are arranged at end portions of the inlet flaps 66 and 68, respectively. However, the way of opening and closing an inlet flap according to the present disclosure is not limited to the example described above. That is to say, the inlet flap may be, for example, of the sliding type, or of the butterfly type where its rotational shaft is arranged at the center of the inlet flap. This also applied to outlet flaps 74 and 76 described below.

1-1-2-3. Outlets and Outlet Flaps of Outside Air

Moreover, the above-described "cover rear portion" of the acoustic insulation cover 50 is provided with a plurality of (in the example shown in FIG. 1, two) outlets 70 and 72 configured to discharge the outside air introduced into the interior of the acoustic insulation cover 50, and a plurality of (in the example shown in FIG. 1, two) outlet flaps 74 and 76 configured to respectively open and close these outlets 70 and 72.

To be more specific, the first outlet 70 corresponds to an opening portion located on the lower portion of the cover piece 52 on the vehicle rear side, and is formed to mainly discharge the outside air introduced toward the water jacket portion 32a from the first inlet 62. The second outlet 72 corresponds to an opening portion located on the lower portion of the cover piece 60, and is formed to mainly discharge the outside air introduced toward the oil pan 36 from the second inlet 64. The widths of these outlets 70 and 72 in the left-right direction of the vehicle 1 are not particularly limited, and are voluntarily determined, for example, such that, in association with the installation locations of the inlets 62 and 64, superior ventilation performance is achieved in the interior of the acoustic insulation cover 50. For example, these widths may be determined so as to be equal to a part or all of the widths of the cover pieces 52 and 60 in the left-right direction of the vehicle 1. It should be noted that, instead of this kind of examples, a plurality of outlets and a plurality of outlet flaps may be arranged at one cover piece.

The first outlet flap 74 is configured to open and close the first outlet 70, and the second outlet flap 76 is configured to open and close the second outlet 72. These outlet flaps 74 and 76 are electrically driven, as an example.

It should be noted that, contrary to the example shown in FIG. 1, the cover pieces 54 and 56 may be, for example, integrally formed as one cover piece, and thus, the first inlet 62 may be arranged at a middle portion of this kind of one cover piece not at the end portion of the cover piece 54. Similarly, the cover pieces 58 and 60 may be, for example, integrally formed as one cover piece, and thus, the second outlet 72 may be arranged at a middle portion of this kind of one cover piece not at the end portion of the cover piece 60.

1-1-3. Control Device

The acoustic insulation system 10 according to the present embodiment is further provided with a control device 80 for controlling the opening and closing of each of the inlet flaps 66 and 68 and the outlet flaps 74 and 76. The control device 80 is an electronic control unit (ECU) that includes at least one processor, at least one memory, and an input/output interface.

The input/output interface receives sensor signals from various sensors mounted on the internal combustion engine 20 and the vehicle 1, and also outputs actuating signals to the inlet flaps 66 and 68 and the outlet flaps 74 and 76 which correspond to actuators. The various sensors described above include an air flow sensor 82, a crank angle sensor 84, a water temperature sensor 86, an oil temperature sensor 88, an outside air temperature sensor 90 and an accelerator position sensor 92. These sensors 82 to 92 respectively output signals depending on intake air flow rate of the internal combustion engine 20, crank angle, engine cooling water temperature Tw, engine oil temperature To, outside air temperature, and depression amount of an accelerator pedal (i.e., accelerator position). The control device 80 can calculate an engine speed NE based on signals from the crank angle sensor 84.

In the memory of the control device 80, various programs and various data (including maps) for controlling the acoustic insulation system 10 are stored. The processor executes the programs stored in the memory. As a result, various functions of the control device 80 (such as, introduction of the outside air into the acoustic insulation cover 50, facilitation of discharge of the outside air from the acoustic insulation cover 50, and change of the path of the flow of the outside air in the interior of the acoustic insulation cover 50) are achieved. It should be noted that the control device 80 may alternatively be configured with, for example, four ECUs that are separately provided for the respective inlet flaps 66, 68 and outlet flaps 74, 76.

1-2. Operation of Acoustic Insulation System

Then, the operation of the acoustic insulation system 10 according to the present embodiment will be described with reference to FIGS. 2 to 5.

FIG. 2 is a schematic diagram that illustrates a fully closed mode in which all of two inlet flaps 66 and 68 and two outlet flaps 74 and 76 are closed. According to this fully closed mode, even when the internal combustion engine 20 is exposed to the relative wind (or wind from the cooling fan 5), inflow of the outside air into the interior of the acoustic insulation cover 50 can be reduced. As a result, heat release (cooling) of the internal combustion engine 20 by the outside air can be maximally reduced. In addition, according to the fully closed mode, a coverage ratio by the acoustic insulation cover 50 (i.e., the ratio of the surface area of a portion of the internal combustion engine 20 covered by the acoustic insulation cover 50 including the flaps 66, 68, 74, and 76 with respect to the whole surface area of the internal combustion engine 20) becomes highest. Because of this, the effect of reducing engine noise (i.e., radiated sound from the internal combustion engine 20) becomes highest.

FIG. 3 is a schematic diagram that illustrates a fully open mode in which all of two inlet flaps 66 and 68 and two outlet flaps 74 and 76 are open. According to this fully open mode, the effect of heat release (cooling) of the internal combustion engine 20 by the outside air can be maximized. The main paths of the flow of the outside air in the interior of the acoustic insulation cover 50 during the fully open mode are schematically shown by arrows A and B in FIG. 3.

Specifically, the outside air that has flown into the interior of the acoustic insulation cover 50 from the first inlet 62 flows toward the first outlet 70 as shown by the arrow A and is then discharged from the first outlet 70. In more detail, the outside air that has flown into the interior of the acoustic insulation cover 50 from the first inlet 62 mainly flows along the water jacket portion 32*a*, then flows toward the upper side from the lower side along the side end surfaces of the engine main body 28 located on the vehicle left side and vehicle right side, and is then discharged from the first outlet 70. On the other hand, as shown by the arrow B, the outside air that has flown into the interior of the acoustic insulation cover 50 from the second inlet 64 flows around the oil pan 36 and is then discharged from the second outlet 72.

Figure 4:
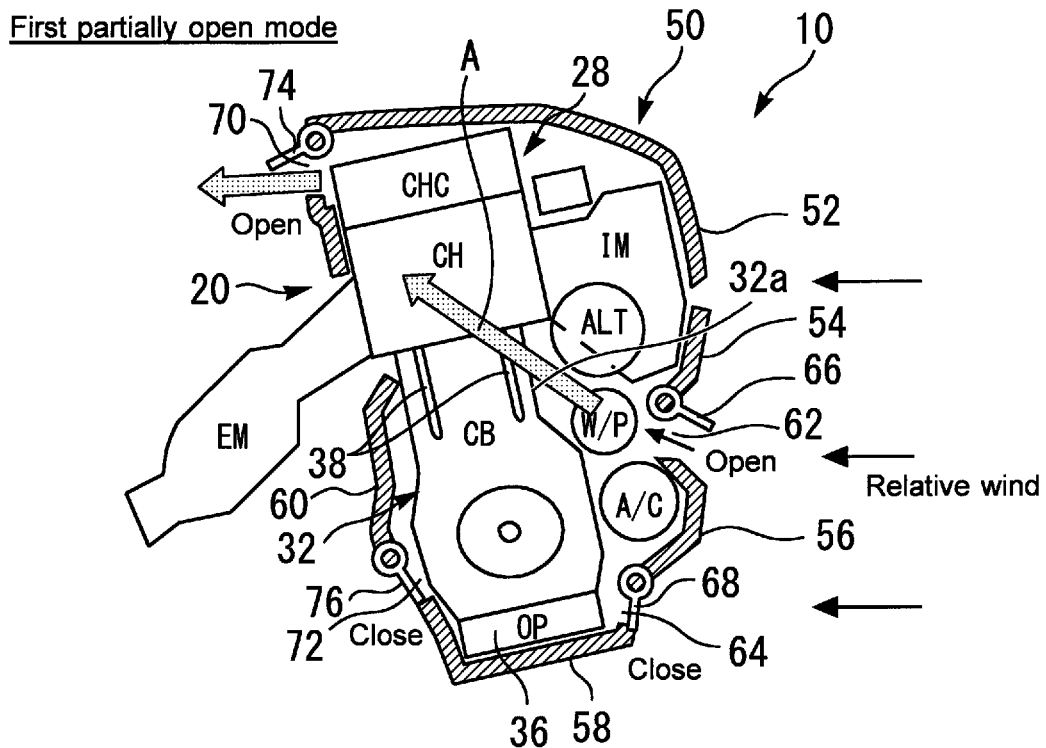
FIG. 4 is a schematic diagram that illustrates a first partially open mode in which the first inlet flap and the first outlet flap are open and the second inlet flap and the second outlet flap are closed.

FIG. 4 is a schematic diagram that illustrates a first partially open mode in which the first inlet flap 66 and the first outlet flap 74 are open and the second inlet flap 68 and the second outlet flap 76 are closed. According to this first partially open mode, the main path of the flow of the outside air in the interior of the acoustic insulation cover 50 is as shown by the arrow A as described with reference to FIG. 3. As a result, the flow of the outside air can be controlled in such a manner as to mainly pass through a designated portion (in this example, water jacket portion 32*a*) and not to pass through another designated portion (in this example, oil pan 36). Because of this, heat release (cooling) by the outside air can be facilitated at the designated portion, and also introduction of air can be blocked at another designated portion mentioned above to reduce heat release (cooling).

Figure 5:
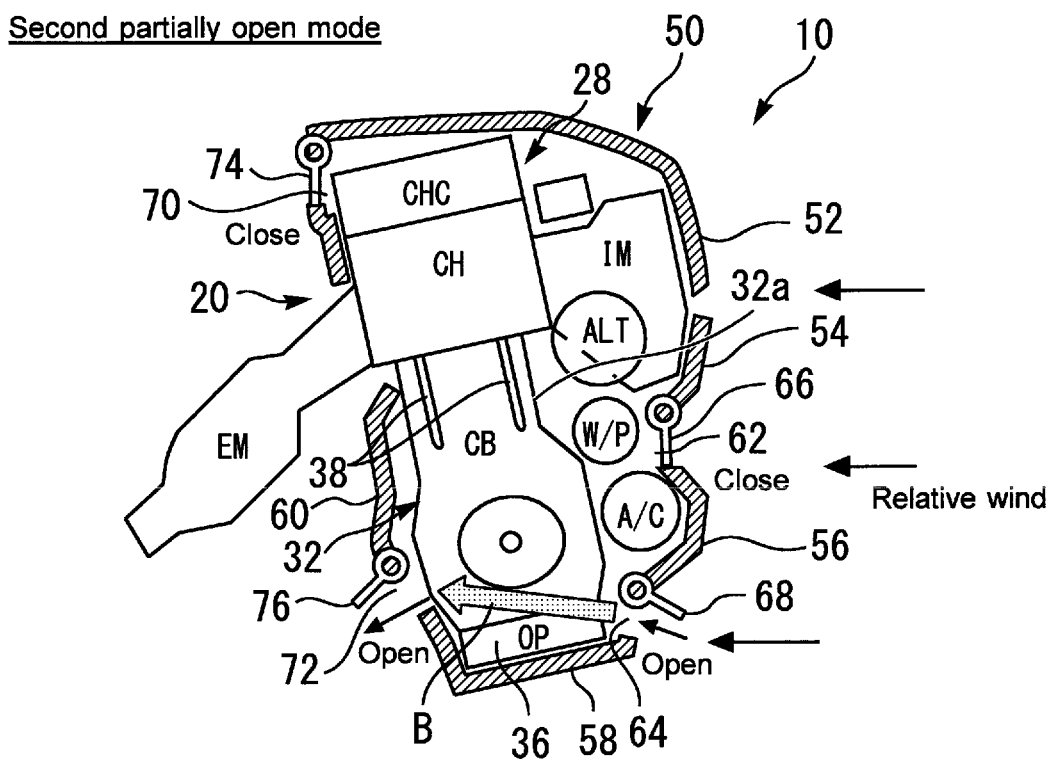
FIG. 5 is a schematic diagram that illustrates a second partially open mode in which the first inlet flap and the first outlet flap are closed and the second inlet flap and the second outlet flap are open.

FIG. 5 is a schematic diagram that illustrates a second partially open mode in which the first inlet flap 66 and the first outlet flap 74 are closed and the second inlet flap 68 and the second outlet flap 76 are open. According to this second partially open mode, the main path of the flow of the outside air in the interior of the acoustic insulation cover 50 is as shown by the arrow B as described with reference to FIG. 3. According to this second partially open mode, the flow of the outside air can also be controlled in such a manner as to mainly pass through a designated portion (in this example, oil pan 36) and not to pass through another designated portion (in this example, water jacket portion 32*a*). As a result, contrary to the example of the first partially open mode, heat release (cooling) by the outside air can be facilitated at the portion near the oil pan 36, and also introduction of air can be blocked at the water jacket portion 32*a* to reduce heat release (cooling).

1-3. Advantageous Effects Concerning Configuration of Acoustic Insulation System As described so far, the acoustic insulation system 10 according to the present embodiment is provided with the plurality of (as an example, two) inlets 62 and 64 and the plurality of (as an example, two) inlet flaps 66 and 68 that can respectively open and close these inlets 62 and 64. In an example in which only one set of an inlet and an inlet flap is included, the path of the flow of the outside air taken into the interior of an acoustic insulation cover is uniform. In contrast to this, according to the present embodiment, by changing the opening and closing of the inlet flaps 66 and 68 individually or collectively, the path of the flow of the outside air can be changed as shown in FIGS. 2 to 5. That is to say, the freedom of selecting the path of the flow of the outside air can be given. In this way, according to the acoustic insulation system 10, the path of the flow of the outside air taken into the interior of the acoustic insulation cover 50 that covers the internal combustion engine 20 can be more properly controlled.

Moreover, as a result of the above, the path of the flow of the outside air in the interior of the acoustic insulation cover 50 can be properly controlled in response to the needs based on the individual operating conditions of the internal combustion engine 20 or the individual needs of a plurality of engine parts. Specifically, the use of the fully closed mode is suitable, for example, when facilitation of heat-retention or warm-up of the internal combustion engine 20 is required. The use of the fully open mode is suitable, for example, when facilitation of heat release (cooling) of the internal combustion engine 20 is required. The use of the first partially open mode is suitable, for example, when, although facilitation of heat release from the water jacket portion 32*a* is required, reduction of heat release of the portion around the oil pan 36 is required. Furthermore, the use of the second partially open mode is suitable, for example, when, although facilitation of heat release of the portion around the oil pan 36 is required contrary to the above, reduction of heat release from the water jacket portion 32*a* is required. Thus, the acoustic insulation system 10 can more properly meet various needs as described above, for example. As a result, occurrence of a hot spot or shortage of heat release in the interior of the acoustic insulation cover 50 due to the fact that the internal combustion engine 20 is covered by the acoustic insulation cover 50 is reduced. Therefore, the need of countermeasures against high heat generation, such as increase of the capacity of a cooling system or addition of an oil cooler can be decreased.

Moreover, the acoustic insulation system 10 according to the present embodiment is provided with the plurality of (as an example, two) outlets 70 and 72 and the plurality of (as an example, two) outlet flaps 74 and 76 that can respectively open and close these outlets 70 and 72. Thus, discharge of the outside air taken into the interior of the acoustic insulation cover 50 from the inlets 62 and 64 described above can be facilitated, and, as a result, introduction of the outside air from the inlets 62 and 64 can be facilitated. When the coverage ratio defined as already described becomes higher, it becomes more difficult to sufficiently discharge the outside air taken into the interior of an acoustic insulation cover using only a gap between cover pieces. Because of this, the installation of the outlets 70 and 72 is effective to sufficiently achieve the ventilation performance in an internal combustion engine provided with an acoustic insulation structure with a high coverage ratio as in the internal combustion engine 20 according to the present embodiment.

2. Second Embodiment

Then, a second embodiment according to the present disclosure will be described with additional reference to FIGS. 6 and 7 as well as FIGS. 2 to 5.

2-1. Concrete Examples and Advantageous Effects of Control of Flaps

In the following description, it is supposed that the configuration of the acoustic insulation system 10 shown in FIG. 1 is used as an example of the hardware configuration of an acoustic insulation system according to the second embodiment. As already described, according to the acoustic insulation system 10, the path of the flow of the outside air taken into the interior of the acoustic insulation cover 50 can be more properly controlled. In the present embodiment, concrete control manners concerning this kind of acoustic insulation system 10 will be described.

2-1-1. During Engine Stop

During engine stop, it is required to facilitate the effect of heat-retention of the internal combustion engine 20 (more specifically, the effect of heat-retention of the engine cooling water and the engine lubricating oil). Thus, according to the present embodiment, during engine stop, the control device 80 selects the fully closed mode in which all of the inlet flaps 66 and 68 and the outlet flaps 74 and 76 are closed (see FIG. 2). As a result, the effect of heat-retention of the internal combustion engine 20 during engine stop can be highly achieved.

2-1-2. During Engine Warm-Up Operation

During engine warm-up operation, the fully closed mode is basically used for facilitation of the warm-up. On that basis, according to the present embodiment that uses the acoustic insulation system 10 that can more properly control the path of the flow of the outside air, the following control is executed in order to more properly meet the needs from the individual engine parts.

Figure 6:
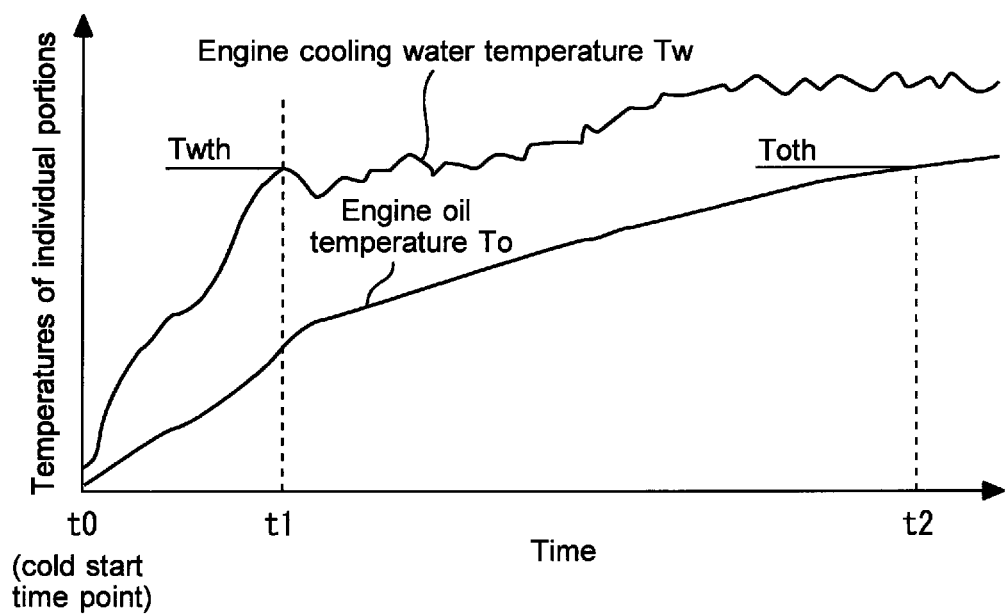
FIG. 6 is a time chart that illustrates changes of engine cooling water temperature Tw and engine oil temperature To after a cold start of the internal combustion engine.

FIG. 6 is a time chart that illustrates changes of the engine cooling water temperature Tw and the engine oil temperature To after a cold start of the internal combustion engine 20. After the start of the cold start at a time point t0, both of the engine cooling water temperature Tw and the engine oil temperature To increase with a lapse of time. However, the degrees of increase of these temperatures are not equal to each other, and the engine cooling water temperature Tw increases earlier than the engine oil temperature To as shown in FIG. 6. The inventor has noted that, as just described, there is a difference between the times for temperature increase of the engine cooling water and engine oil that function as heat storage sources (cooling sources) of the internal combustion engine 20.

According to the present embodiment, at the initial stage of the engine warm-up operation after the cold start (i.e., at the time of the engine cooling water temperature Tw being lower than a threshold value Twth for warm-up determination and the engine oil temperature To being lower than a threshold value Toth for warm-up determination), the control device 80 selects the fully closed mode (see FIG. 2). Because of this, at the initial stage of the engine warm-up, the whole warm-up of the internal combustion engine 20 can be effectively facilitated.

If the engine cooling water temperature Tw is reached to the threshold value Twth thereafter, the control device 80 switches the control mode from the fully closed mode to the first partially open mode (see FIG. 4) even when the engine oil temperature To has not yet been reached to the threshold value Toth. As a result, the flow of the outside air is formed around the water jacket portion 32a (i.e., the portion that dissipates the heat of the engine cooling water in the water jacket 38). Because of this, the heat release from this portion is facilitated, and an excess increase of the engine cooling water temperature Tw can be reduced. On the other hand, the flow of the outside air is not introduced into the portion around the oil pan 36. Because of this, facilitation of temperature increase of the engine lubricating oil that is still in the course of the warm-up can be continued.

If the engine oil temperature To is reached to the threshold value Toth thereafter (i.e., if the engine warm-up is completed), the control device 80 switches the control mode from the first partially open mode to the fully open mode (see FIG. 3). As a result, the flow of the outside air is also introduced into the portion around the oil pan 36, and the heat release from this portion is also facilitated. Because of this, with respect to the engine lubricating oil whose warm-up is belatedly completed, an excess increase of the engine oil temperature To can be reduced. It should be noted that, although an example is herein described in which the threshold values Twth and Toth are the same as each other, the threshold values Twth and Toth may alternatively be different from each other. In addition, the threshold value Twth corresponds to an example of the "first warm-up determination temperature" according to the present disclosure, and the threshold value Toth corresponds to an example of the "second warm-up determination temperature" according to the present disclosure.

2-1-3. During Vehicle Acceleration

The higher the engine speed NE becomes, the higher the sound pressure level of engine noise (i.e., radiated sound from the internal combustion engine) becomes. This is because the number of cycles per unit time becomes greater when the engine speed NE becomes higher. Thus, according to the present embodiment, the control device 80 selects the fully closed mode during vehicle acceleration running associated with an increase of the engine speed NE. In more detail, the fully closed mode is continuously selected during vehicle acceleration running. Because of this, leakage of the engine noise from the interior of the acoustic insulation cover 50 can be effectively reduced at the time of vehicle acceleration running during which the engine noise is likely to be high, and, as a result, the vehicle exterior noise can be effectively reduced.

Additionally, the selection of the fully closed mode during vehicle acceleration running is executed even during use of the fully open mode after the completion of the warm-up, and thus, switching from the fully open mode to the fully closed mode is executed. In more detail, during the actual running of a vehicle, acceleration time in which the vehicle is accelerating is finite. In addition, an internal combustion engine generally has a margin such that, even if the heat release is disturbed within a limited short acceleration time, the engine cooling water temperature Tw or the engine oil temperature To is not reached to a temperature limit thereof. Because of this, according to the present embodiment, at the time of the vehicle acceleration running, the control mode is changed as described above such that reduction of the vehicle exterior noise is given priority. It should be noted that the selection of the fully closed mode during vehicle acceleration running is similarly executed even during use of the above-described first partially open mode in the course of the warm-up.

2-1-4. Designated Operating Condition A (Low-Outside-Air-Temperature, High-Speed and High-Load Condition)

There is an engine operating condition (hereunder, referred to as a "designated operating condition A" for convenience) that, when the outside air temperature is low and the engine speed NE is high and the engine load KL is high, the engine cooling water temperature Tw decreases since the heat exchange at the radiator 4 due to the relative wind is sufficiently performed, while the engine oil temperature To increases.

According to the present embodiment, when the engine operating condition corresponds to the designated operating condition A as described above even after the completion of the engine warm-up, the control device 80 switches the control mode from the fully open mode to the second partially open mode. As a result, the flow of the outside air is not introduced into the water jacket portion 32a. Because of this, an excess decrease of the engine cooling water temperature Tw can be reduced. On the other hand, the flow of the outside air is formed at the portion around the oil pan 36. Because of this, since the heat release from this portion can be facilitated, an excess increase of the engine oil temperature To can be reduced.

Additionally, according to the present embodiment, a decrease of the vehicle exterior noise is given priority, and the switching to the second partially open mode is not performed during the vehicle acceleration running. However, contrary to this example, the switching to the second partially open mode may be given priority (that is, this switching may also be performed during vehicle acceleration running).

2-2. Processing of Control Device Concerning Control of Flaps

Figure 7:
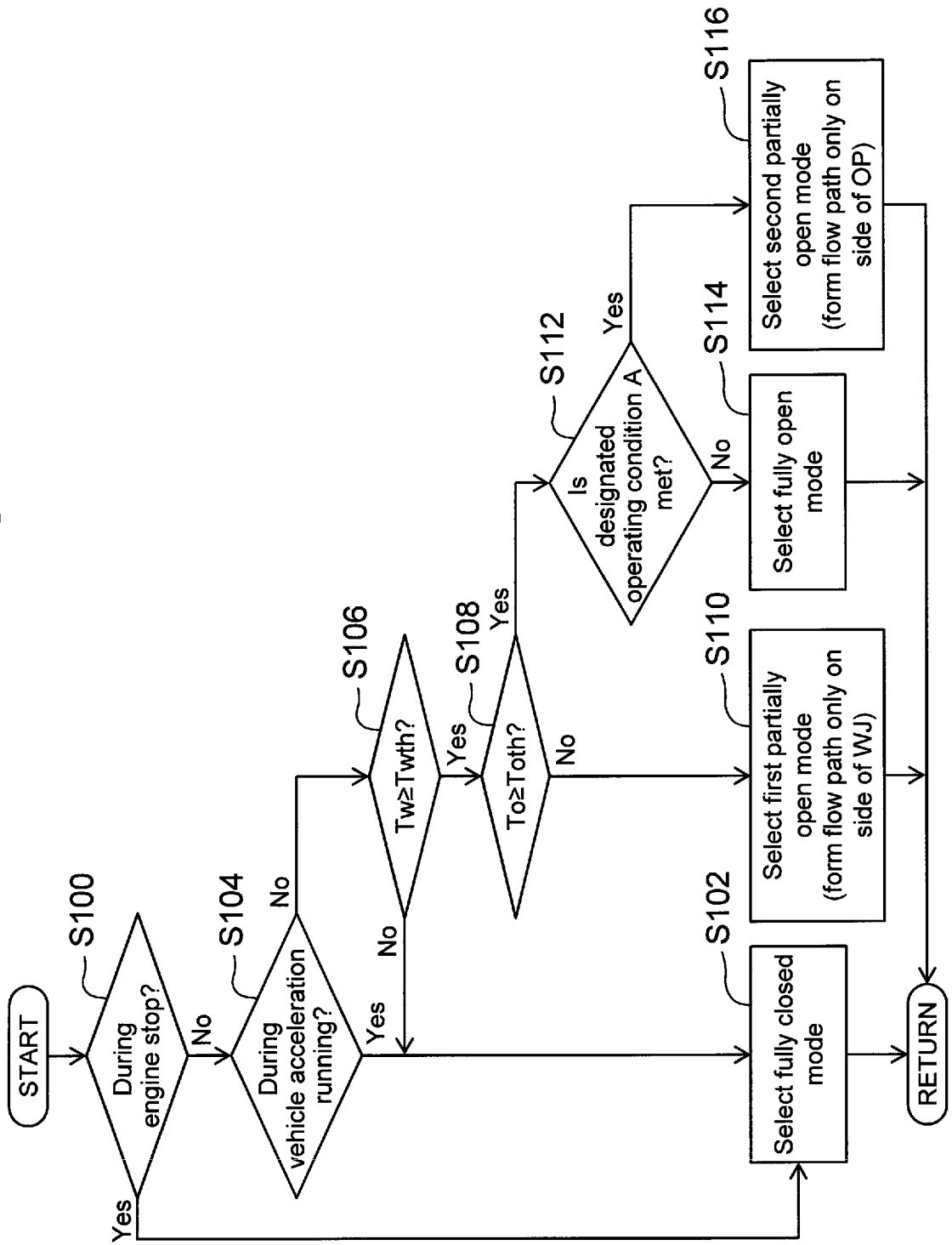
FIG. 7 is a flow chart that shows a routine of the processing concerning the control of the flaps according to a second embodiment of the present disclosure.

FIG. 7 is a flow chart that shows a routine of the processing concerning the control of the flaps 66, 68, 74 and 76 according to the second embodiment of the present disclosure. The control device 80 repeatedly executes the processing according to the present routine at a designated control interval.

According to the routine shown in FIG. 7, first, the control device 80 determines in step S100 whether or not the internal combustion engine 20 is stopped. This determination can be performed on the basis of, for example, whether the engine speed NE obtained by the use of the crank angle sensor 84 is zero or not. If the determination result of step S100 is positive, the processing proceeds to step S102. In step S102, the control device 80 selects the fully closed mode.

If, on the other hand, the determination result of step S100 is negative, the processing proceeds to step S104. In step S104, the control device 80 determines whether or not the vehicle 1 is accelerating on the basis of the accelerator position obtained by the accelerator position sensor 92. As a result, if this determination result is positive, the processing proceeds to step S102, and the fully closed mode is selected. As just described, during the vehicle acceleration running, the fully closed mode is selected without depending on the degree of progress of the engine warm-up.

If, on the other hand, the determination result of step S104 is negative, (that is, if the vehicle 1 is not accelerating), the processing proceeds to step S106. In step S106, the control device 80 determines whether or not the engine cooling water temperature Tw obtained by the use of the water temperature sensor 86 is higher than or equal to the threshold value Twth described above. As a result, if this determination result is negative (Tw<Twth), that is, if the internal combustion engine 20 is in execution of the engine warm-up operation in which the engine cooling water temperature Tw has not yet sufficiently increased, the processing proceeds to step S102, and the fully closed mode is selected.

If, on the other hand, the determination result of step S106 is positive (Tw≥Twth), the processing proceeds to step S108. In step S108, the control device 80 determines whether or not the engine oil temperature To obtained by the use of the oil temperature sensor 88 is higher than or equal to the threshold value Toth described above. As a result, if the determination result of step S108 is negative (To<Toth), that is, if, although the engine cooling water temperature Tw has properly increased, the engine oil temperature To is still in the course of the warm-up, the processing proceeds to step S110. In step S110, the control device 80 selects the first partially open mode (which forms the flow path only on the side of the water jacket (WJ) 38).

If, on the other hand, the determination result of step S108 is positive (To≥Toth), that is, if it can be judged that the engine warm-up has been completed, the processing proceeds to step S112. In step S112, the control device 80 determines whether the designated operating condition A described above is met or not. This determination can be performed as follows, for example. That is to say, the control device 80 stores the respective threshold values of the outside air temperature, the engine speed NE and the engine load KL that are used for determining that the designated operating condition A is met. The control device 80 compares the current outside air temperature, engine speed NE and engine load KL with the respective threshold values to determine whether the designated operating condition A described above is met or not. These threshold values respectively correspond to examples of the "temperature threshold value", the "speed threshold value" and the "load threshold value" according to the present disclosure. The outside air temperature is obtained by the use of the outside air temperature sensor 90. In addition, the engine load KL (more specifically, the charging efficiency of air in the cylinder) can be calculated, on the basis of, for example, the intake air flow rate obtained by the use of the air flow sensor 82 and the engine speed NE.

If the determination result of step S112 is negative (that is, if the designated operating condition A is not met after the completion of the engine warm-up), the processing proceeds to step S114. In step S114, the control device 80 selects the fully open mode.

If, on the other hand, the determination result of step S112 is positive, (that is, if the designated operating condition A is met after the completion of the engine warm-up), the processing proceeds to step S116. In step S116, the control device 80 selects the second partially open mode (which forms the flow path only on the side of the oil pan (OP) 36).

3. Third Embodiment

Then, a third embodiment according to the present disclosure will be described with reference to FIG. 8.

3-1. Configuration of Acoustic Insulation System

Figure 8:
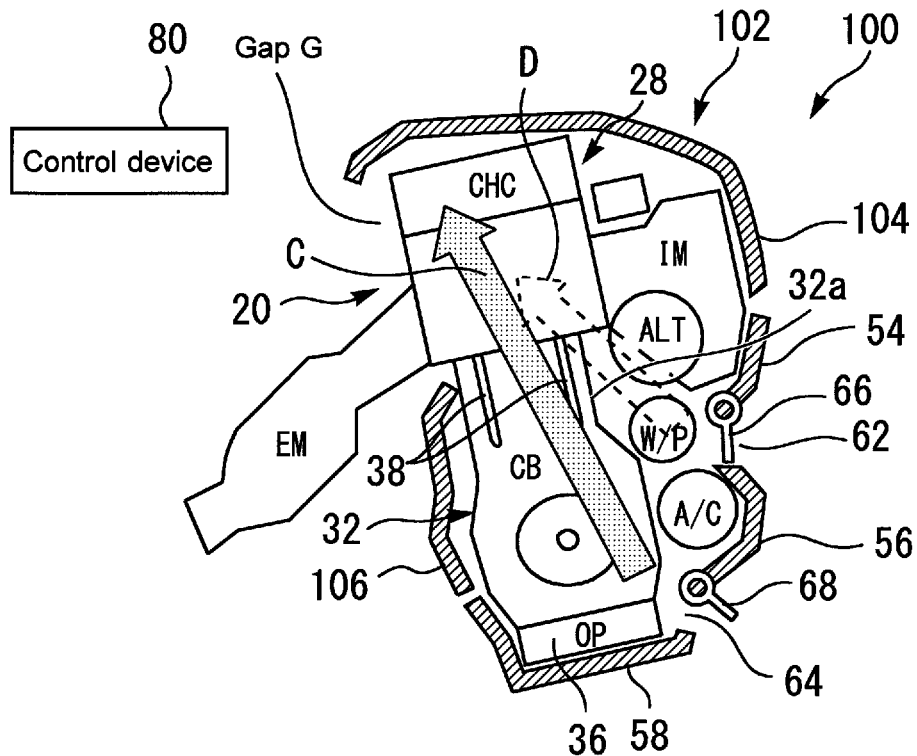
FIG. 8 is a schematic diagram (vehicle side view) for describing the configuration of an acoustic insulation system for an internal combustion engine according to a third embodiment of the present disclosure.

FIG. 8 is a schematic diagram (vehicle side view) for describing the configuration of an acoustic insulation system 100 for an internal combustion engine according to the third embodiment of the present disclosure. The acoustic insulation system 100 according to the present embodiment is different from the acoustic insulation system 10 according to the first embodiment in terms of the configuration of the acoustic insulation cover.

Specifically, an acoustic insulation cover 102 of the acoustic insulation system 100 is provided with cover pieces 104 and 106 as well as the cover pieces 54, 56 and 58 similar to those of the acoustic insulation cover 50 shown in FIG. 1. The cover piece 104 has a basic shape similar to that of the cover piece 52 shown in FIG. 1. However, the first outlet 70 and the first outlet flap 74 are not arranged at the lower portion of the cover piece 104 located on the vehicle rear side. Similarly, the cover piece 106 is different from the cover piece 60 shown in FIG. 1 in terms of the second outlet 72 and the second outlet flap 76 being not arranged at the lower portion of the cover piece 106.

On that basis, instead of the first outlet 70, the acoustic insulation cover 102 has a gap G at the same position as the first outlet 70 of the acoustic insulation cover 50. In addition, the acoustic insulation cover 102 is the same as the acoustic insulation cover 50 in terms of two inlets 62 and 64 and two inlet flaps 66 and 68 being provided.

3-2. Operation and Advantageous Effects of Acoustic Insulation System

FIG. 8 shows an operation state in which the first inlet flap 66 is closed and the second inlet flap 68 is open. In the example shown in FIG. 8, the gap G is arranged at the upper portion of the engine main body 28 located on the vehicle rear side. Because of this, as shown by an arrow C, the outside air taken into the interior of the acoustic insulation cover 102 from the second inlet 64 flows in such a manner as to move along the engine main body 28 toward the upper side from the portion around the oil pan 36, and is then discharged from the gap G.

Moreover, contrary to the operation state shown in FIG. 8, the control device 80 can open the first inlet flap 66 and close the second inlet flap 68. In this operation state, as shown by an arrow D, the outside air taken into the interior of the acoustic insulation cover 102 from the first inlet 62 flows in such a manner as to move along the engine main body 28 toward the upper side from the portion around the water jacket portion 32a of the cylinder block 32, and is then discharged from the gap G. As just described, in this operation state, the outside air is taken from a location higher than that in the operation state of the second inlet flap 68 being open, and flows through the interior of the acoustic insulation cover 102.

Furthermore, the control device 80 can also open both of the inlet flaps 66 and 68. As a result, the flows shown by both of the arrows C and D can be generated. As described above, according to the acoustic insulation system 100 of the present embodiment, a higher degree of freedom of selection of the path of the flow of the outside air can also be given as compared to the example in which only one set of an inlet and an inlet flap is arranged. In addition, according to the acoustic insulation system 100, although the degree of freedom of selection of the path of the flow of the outside air becomes lower than the acoustic insulation system 10 that additionally includes the outlets 70 and 72 and the outlet flaps 74 and 76, a certain degree of freedom can be given while reducing cost. As a result, the path of the flow of the outside air in the interior of the acoustic insulation cover 50 can be properly controlled in response to the needs based on the individual operating conditions of the internal combustion engine 20 or the individual needs of a plurality of engine parts.

Additionally, in the acoustic insulation system 100 according to the above-described third embodiment which does not include an outlet and an outlet flap, a routine similar to the routine shown in FIG. 7 according to the second embodiment may be executed for only the inlet flaps 66 and 68.

4. Fourth Embodiment

Then, a fourth embodiment according to the present disclosure will be described with reference to FIG. 9.

4-1. Configuration of Acoustic Insulation System

Figure 9:
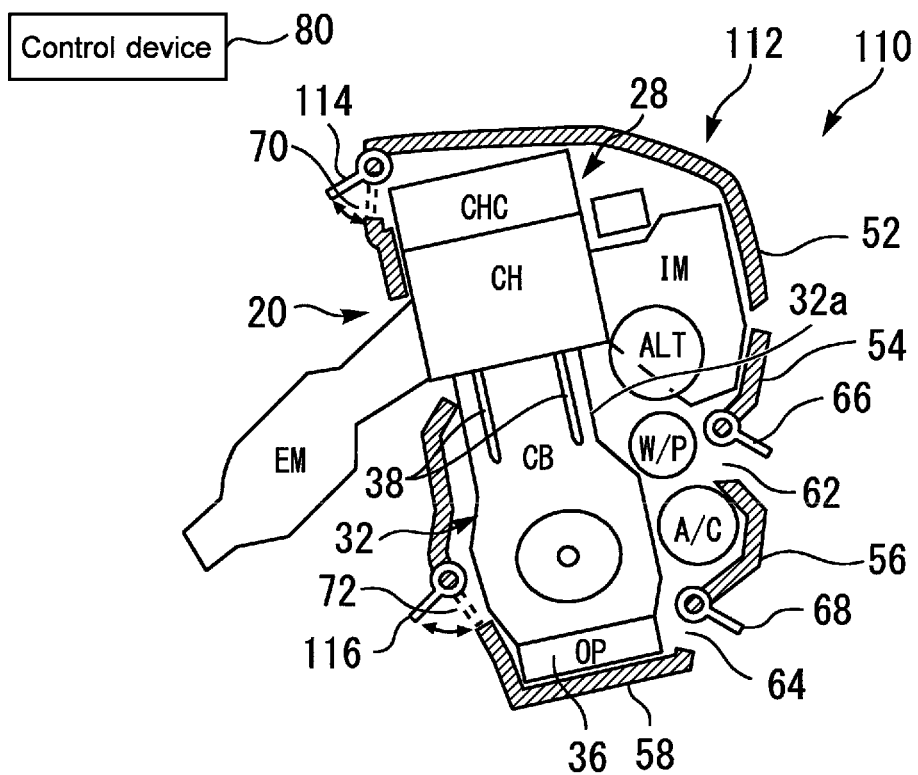
FIG. 9 is a schematic diagram (vehicle side view) for describing the configuration of an acoustic insulation system for an internal combustion engine according to a fourth embodiment of the present disclosure.

FIG. 9 is a schematic diagram (vehicle side view) for describing the configuration of an acoustic insulation system 110 for an internal combustion engine according to the fourth embodiment of the present disclosure. The acoustic insulation system 110 according to the present embodiment is different from the acoustic insulation system 10 according to the first embodiment in terms of the configuration of the outlet flaps.

Specifically, an acoustic insulation cover 112 of the acoustic insulation system 110 is provided with a first outlet flap 114 and a second outlet flap 116, instead of the first outlet flap 74 and the second outlet flap 76. The outlet flaps 114 and 116 are wind-operated flaps configured to open by wind pressure generated in the interior of the acoustic insulation cover 112. In detail, the first outlet flap 114 is configured to close when there is no wind pressure, and naturally open when wind pressure is generated as a result of the first inlet flap 66 opening. This similarly applies to the relationship between the second outlet flap 116 and the second inlet flap 68. As described above, as a result of the outlet flaps 114 and 116 opening in conjunction with the inlet flaps 66 and 68, the outside air flows through the interior of the acoustic insulation cover 112.

4-2. Advantageous Effects of Acoustic Insulation System

According to the acoustic insulation system 110 described so far, a higher degree of freedom of selection of the path of the flow of the outside air can be given as compared to the example in which only one set of an inlet and an inlet flap is arranged, while simplifying the outlet flaps 114 and 116 to reduce cost of the acoustic insulation system 110.

5. Other Embodiments

FIGS. 10A to 10D are schematic diagrams (vehicle side views) for describing other examples of the configuration of an inlet flap according to the present disclosure. A "cover front portion" of an acoustic insulation cover 120 shown in FIG. 10A includes cover pieces 122 and 124. An inlet 126 (i.e., opening portion) is formed at a lower portion of the cover piece 122. An inlet flap 128 of the butterfly type is installed in the inlet 126. The inlet flap 128 is electrically driven, as an example. The opening and closing of the inlet flap 128 is controlled by a control device similar to the control device 80.

The inlet 126 is one of a plurality of inlets of the acoustic insulation cover 120 (illustration of inlets other than the inlet 126 is omitted). The inlet flap 128 is one of a plurality of inlet flaps of the acoustic insulation cover 120 (illustration of inlet flaps other than the inlet flap 128 is omitted). The opening degree of the inlet flap 128 of the butterfly type is controlled, whereby, as described below, the path of the flow of the outside air taken into the interior of the acoustic insulation cover 120 can be properly controlled in addition to the opening and closing of the inlet 126.

Figure 10A:
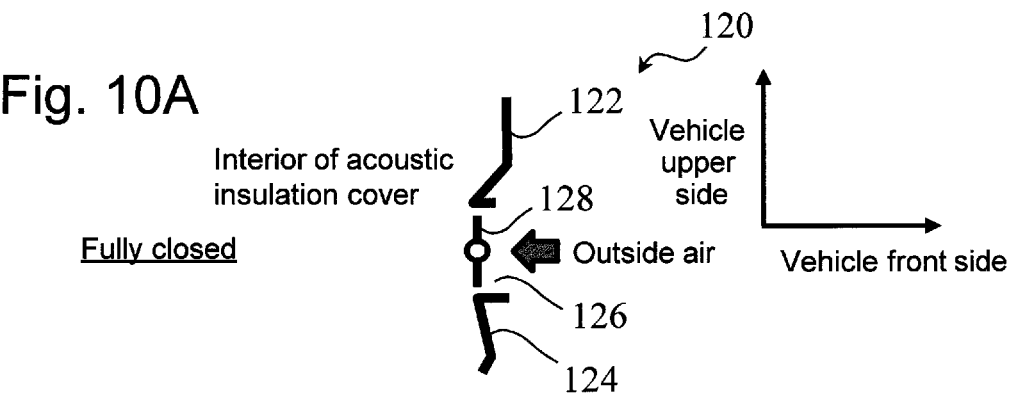
FIG. 10A is a schematic diagram (vehicle side view) for describing an example of the configuration of an inlet flap according to the present disclosure.
Figure 10B:
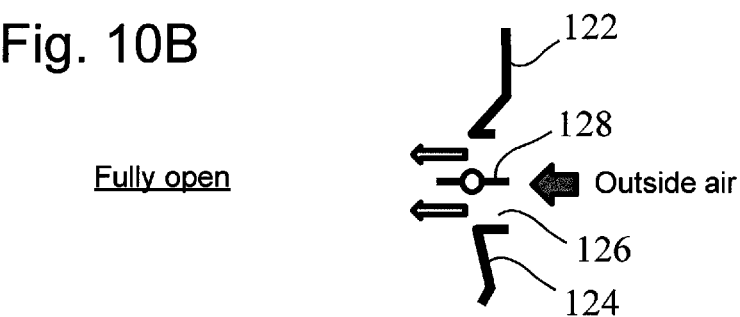
FIG. 10B is a schematic diagram (vehicle side view) for describing an example of the configuration of an inlet flap according to the present disclosure.

That is to say, according to the control of the opening degree of the inlet flap 128, the inlet 126 can be fully closed as shown in FIG. 10A. In addition, according to the control of the opening degree of the inlet flap 128, the inlet 126 can be made fully open as shown in FIG. 10B.

Figure 10C:
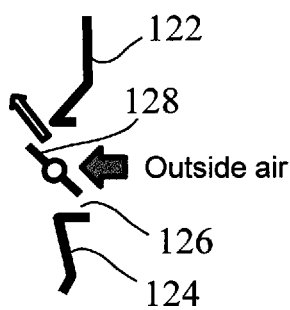
FIG. 10C is a schematic diagram (vehicle side view) for describing an example of the configuration of an inlet flap according to the present disclosure.
Figure 10D:
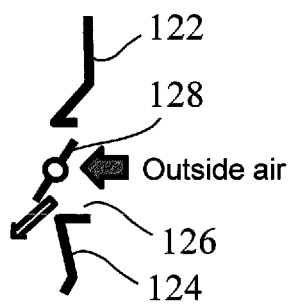
FIG. 10D is a schematic diagram (vehicle side view) for describing an example of the configuration of an inlet flap according to the present disclosure.

Moreover, the inlet 126 may be arranged at a location similar to that of the first inlet 62 (see FIG. 1). As a result, the following path of the flow of the outside air can also be formed. That is to say, the opening degree of the inlet flap 128 may be controlled such that the flow of the outside air is deflected to the vehicle upper side along the surface of the inlet flap 128 as shown in FIG. 10C. As a result, the path of the flow of the outside air can be formed such that the flow rate of the outside air moving toward the vehicle upper side becomes higher, similarly to when the "first partially open mode" described above is used. Furthermore, the opening degree of the inlet flap 128 may be controlled such that the flow of the outside air is deflected to the vehicle lower side along the surface of the inlet flap 128 as shown in FIG. 10D. As a result, the path of the flow of the outside air can be formed such that the flow rate of the outside air moving toward the vehicle lower side becomes higher, similarly to when the "second partially open mode" described above is used. Therefore, according to this kind of examples, the outside air with the flow rate according to the amount of heat release required for the individual portions of the internal combustion engine 20 after the completion of the engine warm-up can also be supplied to the individual portions using the control of the opening degree of the inlet flap 128.

The embodiments and modification examples described above may be combined in other ways than those explicitly described above as required and may be modified in various ways without departing from the scope of the present disclosure.

What is claimed is:

1. An acoustic insulation system for an internal combustion engine mounted on a vehicle, the internal combustion engine including a cylinder block with a water jacket portion that covers a water jacket through which engine cooling water flows, and an oil pan that stores engine lubricating oil, the acoustic insulation system comprising:
   an acoustic insulation cover configured to cover the internal combustion engine with a gap interposed between the acoustic insulation cover and the internal combustion engine; and
   a control device; wherein
   the acoustic insulation cover includes a cover front portion that faces forward of the vehicle,
   the cover front portion includes:
      a plurality of inlets for introducing outside air into an interior of the acoustic insulation cover, and
      a plurality of inlet flaps configured to respectively open and close the plurality of inlets;
   the control device is configured to control opening and closing of the plurality of inlet flaps;
   one of the plurality of inlets is a first inlet configured to introduce the outside air toward the water jacket portion;
   another one of the plurality of inlets is a second inlet configured to introduce the outside air toward the oil pan; and
   the control device is configured, where temperature of the engine cooling water is higher than or equal to a first warm-up determination temperature and temperature of the engine lubricating oil is lower than a second warm-up determination temperature, to control one of the plurality of inlet flaps such that the first inlet opens and control another one of the plurality of inlet flaps such that the second inlet closes.

2. The acoustic insulation system according to claim 1, wherein
   the acoustic insulation cover includes a cover rear portion that faces rearward of the vehicle;
   the cover rear portion includes:
      a plurality of outlets for discharging the outside air introduced into the interior of the acoustic insulation cover, and
      a plurality of outlet flaps configured to respectively open and close the plurality of outlets;
   the control device is configured to open and close the plurality of outlet flaps in addition to the plurality of inlet flaps;
   one of the plurality of outlets is a first outlet configured to discharge the outside air introduced toward the water jacket portion;
   another one of the plurality of outlets is a second outlet configured to discharge the outside air introduced toward the oil pan; and
   the control device is configured, where the temperature of the engine cooling water is higher than or equal to the first warm-up determination temperature and the temperature of the engine lubricating oil is lower than the second warm-up determination temperature, to control one of the plurality of outlet flaps such that the first outlet opens and control another one of the plurality of outlet flaps such that the second outlet closes.

3. An acoustic insulation system for an internal combustion engine mounted on a vehicle, the internal combustion engine including a cylinder block provided with a water jacket portion that covers a water jacket through which engine cooling water flows, and an oil pan that stores engine lubricating oil, the acoustic insulation system comprising:
   an acoustic insulation cover configured to cover the internal combustion engine with a gap interposed between the acoustic insulation cover and the internal combustion engine; and
   a control device; wherein
   the acoustic insulation cover includes a cover front portion that faces forward of the vehicle,
   the cover front portion includes:
      a plurality of inlets for introducing outside air into an interior of the acoustic insulation cover, and
      a plurality of inlet flaps configured to respectively open and close the plurality of inlets;
   the control device is configured to control opening and closing of the plurality of inlet flaps;
   one of the plurality of inlets is a first inlet configured to introduce the outside air toward the water jacket portion;

another one of the plurality of inlets is a second inlet configured to introduce the outside air toward the oil pan; and the control device is configured, where outside air temperature is lower than or equal to a temperature threshold value, engine speed is higher than or equal to a speed threshold value, and engine load is higher than or equal to a load threshold value, to control one of the plurality of inlet flaps such that the first inlet closes and control another one of the plurality of inlet flaps such that the second inlet opens.

4. The acoustic insulation system according to claim 3, wherein the acoustic insulation cover includes a cover rear portion that faces rearward of the vehicle;

the cover rear portion includes:
- a plurality of outlets for discharging the outside air introduced into the interior of the acoustic cover, and
- a plurality of outlet flaps configured to respectively open and close the plurality of outlets;

the control device is configured to open and close the plurality of outlet flaps in addition to the plurality of inlet flaps;

one of the plurality of outlets is a first outlet configured to discharge the outside air introduced toward the water jacket portion;

another one of the plurality of outlets is a second outlet configured to discharge the outside air introduced toward the oil pan; and the control device is configured, where the outside air temperature is lower than or equal to the temperature threshold value, the engine speed is higher than or equal to the speed threshold value, and the engine load is higher than or equal to the load threshold value, to control one of the plurality of outlet flaps such that the first outlet closes and control another one of the plurality of outlet flaps such that the second outlet opens.

* * * * *